(12) United States Patent
Strütt et al.

(10) Patent No.: US 6,644,678 B2
(45) Date of Patent: Nov. 11, 2003

(54) MOUNTING/BEARING DEVICE FOR A FIFTH WHEEL HAVING A STIRRUP-SHAPED BEARING PEDESTAL AND A BRIDGE

(75) Inventors: Achim Strütt, Riedstadt (DE); Ender Yurtsever, Erzhausen (DE); Andreas Maiwald, Niddatal (DE)

(73) Assignee: Jost-Werke GmbH & Co. KG, Frankfurt (DE)

( * ) Notice: Subject to any disclaimer, the term of this patent is extended or adjusted under 35 U.S.C. 154(b) by 112 days.

(21) Appl. No.: 09/951,588

(22) Filed: Sep. 13, 2001

(65) Prior Publication Data

US 2002/0067024 A1 Jun. 6, 2002

(30) Foreign Application Priority Data

Sep. 15, 2000 (DE) .......................... 100 46 088

(51) Int. Cl.$^7$ .............................................. B62D 53/08
(52) U.S. Cl. ..................................... 280/438.1; 280/440
(58) Field of Search ......................... 280/433, 438.1, 280/439, 440, 441.1

(56) References Cited

U.S. PATENT DOCUMENTS

| | | | |
|---|---|---|---|
| 2,784,009 A | * | 3/1957 | Braunberger |
| 2,856,203 A | * | 10/1958 | Kayler |
| 4,671,526 A | * | 6/1987 | Booher .................. 280/433 |
| 4,892,324 A | * | 1/1990 | Spencer et al. ............. 280/440 |
| 5,435,194 A | | 7/1995 | Schedrat et al. |
| 5,882,028 A | * | 3/1999 | Osada ........................ 280/439 |
| 6,302,424 B1 | * | 10/2001 | Gisinger et al. ............ 280/433 |

FOREIGN PATENT DOCUMENTS

| | | |
|---|---|---|
| DE | 23 03 163 | 9/1973 |
| DE | 30 40 925 | 9/1982 |
| DE | 44 02 526 | 8/1994 |
| DE | 199 52 997 | 5/2001 |
| EP | 0 051 113 | 5/1982 |
| GB | 1 430 011 | 3/1976 |
| JP | 11198870 | 7/1999 |

* cited by examiner

Primary Examiner—Avraham Lerner
(74) Attorney, Agent, or Firm—Hudak, Shunk & Farine, Co. LPA

(57) ABSTRACT

The articulating function of a mounting/bearing for fifth wheels is realized by utilizing a bolted connection or by using rubber elements as a displacement coupling. The object of the current invention is to create a mounting/bearing device for a fifth wheel having the advantages of both the bolted coupling and the displacement coupling. A mounting/bearing as claimed by the current invention for a fifth wheel has a stirrup-shaped bearing pedestal and a bridge which can be fastened to a coupling plate of the fifth wheel, whereby a damping element is arranged between the bearing pedestal and the bridge. The damping element is realized as a walking element. This ensures that the mounting/bearing can be manufactured with large manufacturing tolerances and can be easily swiveled.

20 Claims, 3 Drawing Sheets

Schnitt A-A

MOUNTING/BEARING DEVICE FOR A FIFTH WHEEL HAVING A STIRRUP-SHAPED BEARING PEDESTAL AND A BRIDGE

FIELD OF THE INVENTION

The invention refers to mounting/bearing device for a fifth wheel as disclosed in the generic portion of Claim 1.

BACKGROUND OF THE INVENTION

The mounting/bearing for a fifth wheel represents the connection between the coupling plate and the substructures, such as bearing pedestals, mounting plates, lift or displacement devices. These are components which support the fifth wheel and are themselves connected to the vehicle frame. The connection must transfer all forces that occur during operation. Furthermore, it must be possible for the fifth wheel to swivel around the lateral axis of the vehicle by at least 12° as compensation when traveling over uneven ground. With respect to hitching operations with light and empty trailers, it is important that the swivel motion be very easy to initiate. If the mounting/bearing is too stiff, the weight of the trailer may not be sufficient to move an inclined coupling into a position parallel to the bottom of the trailer during hitching. As a result, the king pin is not properly positioned relative to the locking mechanism in the fifth wheel, interfering with the closure of the fifth wheel. A smooth-running mounting/bearing is generally achieved by means of a bolted connection.

Such a mounting/bearing for a fifth wheel is disclosed in the German patent application with the file number 199 52 997.2-21, which discloses a fastening device having a bearing pedestal and a bearing element that interacts with the bearing pedestal, which bearing element can be fastened to a coupling plate of the fifth wheel. The rubber pillow arranged between the bearing pedestal and the bearing element, however, is fabricated from a solid material and thus swiveling of the coupling plate is only possible with the exertion of great force.

DE 44 02 526 A1 discloses a mounting/bearing device for a fifth wheel wherein the connection between the coupling plate and the bearing pedestal is realized by means of a bolt, over which an elastic sleeve or "rubber bushing" is pulled. This type of connection requires complex machining of the coupling plate, bolt and bearing pedestal. The coupling plate swivels stiffly due to the solid material and large friction surfaces.

DE 30 40 925 C2 describes a fifth wheel wherein the articulating function is realized by means of rubber elements. The elasticity of the rubber is utilized to ensure a certain mobility between the bearing pedestal and coupling plate. The coupling plate can be swiveled by displacing the rubber. This type of mounting/bearing for a displacement coupling is very cost-effective to produce, but swivels stiffly due to the large amount of force required to displace the rubber.

DE 23 03 163 B discloses the generic prior art. The mounting/bearing for a fifth wheel described therein comprises a fifth wheel plate supported by a bearing pedestal, which mounting/bearing is fastened to the bottom of the fifth wheel plate by means of a bar extending through the bearing pedestal. The bar has on the bearing pedestal end a fixing device for the fastening of a solid rubber strip intended to dampen any occurring impacts and loads. Like the displacement coupling described above, the solid rubber strip permits swiveling of the fifth wheel only with the exertion of great force.

Another damping element described in DE 23 03 163 B comprises a rubber tube that, when assembled, is completely filled by a bolt and thus cannot or can only slightly facilitate a walking movement.

SUMMARY OF THE INVENTION

It is therefore the object of the current invention to create a smooth running mounting/bearing device for a fifth wheel that does not require costly and complex reworking of the components.

To achieve this object, the current invention teaches that the walking element contains at least one cavity when assembled. A walking element is preferably understood as an elastic element that can still roll in the deformed, in particular the compressed, state.

Installation of a walking element thus ensures the smooth swiveling of the fifth wheel. Examples of preferred materials are rubber, polyurethane or spring steel. The advantage of these is that the installation space can be produced with large manufacturing tolerances. Mechanical reworking of the contact surfaces in the area of the bridge and the stirrup-shaped bearing pedestal are not necessary, as the elasticity of the walking element provides tolerance compensation.

A preferred embodiment of the walking element is characterized by the fact that the walking element is tubular and contains at least one cavity parallel to the lateral axis of the fifth wheel. The tubular shape of the contact surfaces of the walking element enables improved rolling, i.e. walking, of the walking element.

This movement can be performed with the exertion of relatively little force.

A further advantage of the tubular shape of the walking element is that changes in the diameter of the walking element are more easily tolerated than is the case with a solid material because of the manufacturing tolerances. A favorable configuration includes at least one cavity of the walking element that is so large that the inner surfaces of the walking element do not rub against one another, even in the as-installed condition. Rubbing together of the inner surfaces of the walking element hampers the walking movement and under certain circumstances would increase walking element wear.

It is advantageous if the walking element and the stirrup-shaped bearing pedestal or the bridge to include molded elements for the positive/form-fit fixing of the walking element. In a preferred embodiment, the outer surface of the walking element contains at least one nub that engages in a recess in the stirrup-shaped bearing pedestal or the bridge. The nub can be molded onto that side of the walking element facing the stirrup-shaped bearing pedestal and engage in the stirrup-shaped bearing pedestal. Another plausible embodiment has a recess in the walking element and a nub on the stirrup-shaped bearing pedestal or bridge. The positive/form-fit connection of the walking element to the stirrup-shaped bearing pedestal or the bridge is an installation aid during assembly of the fifth wheel and ensures proper positioning of the walking element between the stirrup-shaped bearing pedestal and the bridge.

A preferred embodiment of the mounting/bearing device for a fifth wheel is characterized by the fact that the walking element is fastened to the bridge or the stirrup-shaped bearing pedestal. The connection can be realized as a temporary adhesive connection for the period of installation. The adhesive connection offers the advantage of easy installation, as the rubber pillow can be installed together with the bridge and without shifting or falling off.

An advantageous embodiment has a U-shaped bridge. The U-shape of the bridge and the stirrup-shaped bearing pedestal together define the installation space for the walking element and also pretension the walking element.

In a favorable embodiment, the curvature of the bridge cross-section in the contact area of the walking element with the bridge and the stirrup-shaped bearing pedestal is matched to the stirrup-shaped bearing pedestal such that a wedge-shaped installation space is formed. As the swivel angle around the lateral axis of the vehicle increases, the edge of the walking element is more highly compressed by the wedge-shaped installation space, limiting the walking movement. With proper material selection and design of the walking element, the wedge-shaped installation space establishes a return moment in the direction of the start position, so that the fifth wheel returns to a position parallel to the underside of the trailer. This is advantageous when hitching a light or empty trailer.

It is advantageous if the bridge comprises two arms and a connecting web, whereby the connecting web has a step-like projection in at least one area between the walking element the arm. In the event of tensile loading of the fifth wheel, such as occurs in curves, the step-like projection acts as an end stop and protects the walking element against damage.

A preferred embodiment is characterized by at least two retaining elements protruding circumferentially on the inner surface of the stirrup-shaped bearing pedestal. These retaining elements help to limit the movement of the walking element around the lateral axis of the vehicle and fix the position of the walking element in the bearing pedestal.

BRIEF DESCRIPTION OF THE SEVERAL VIEWS OF THE DRAWINGS

One embodiment of the invention is described in greater detail below with reference to the attached drawings.

DETAILED DESCRIPTION OF THE INVENTION

Figure 1:
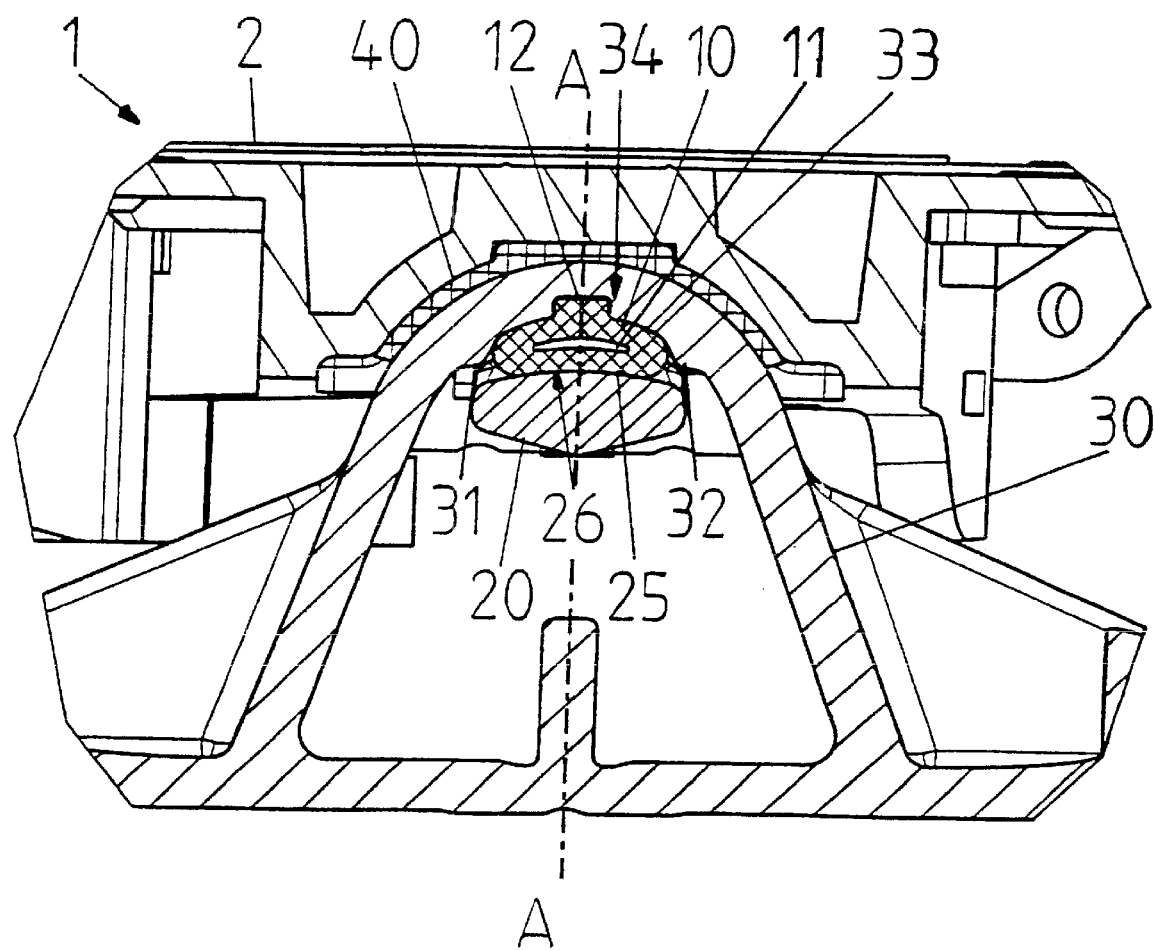
FIG. 1 is a cross-section of one embodiment of the mounting/bearing for a fifth wheel as claimed by the current invention.
Figure 2:
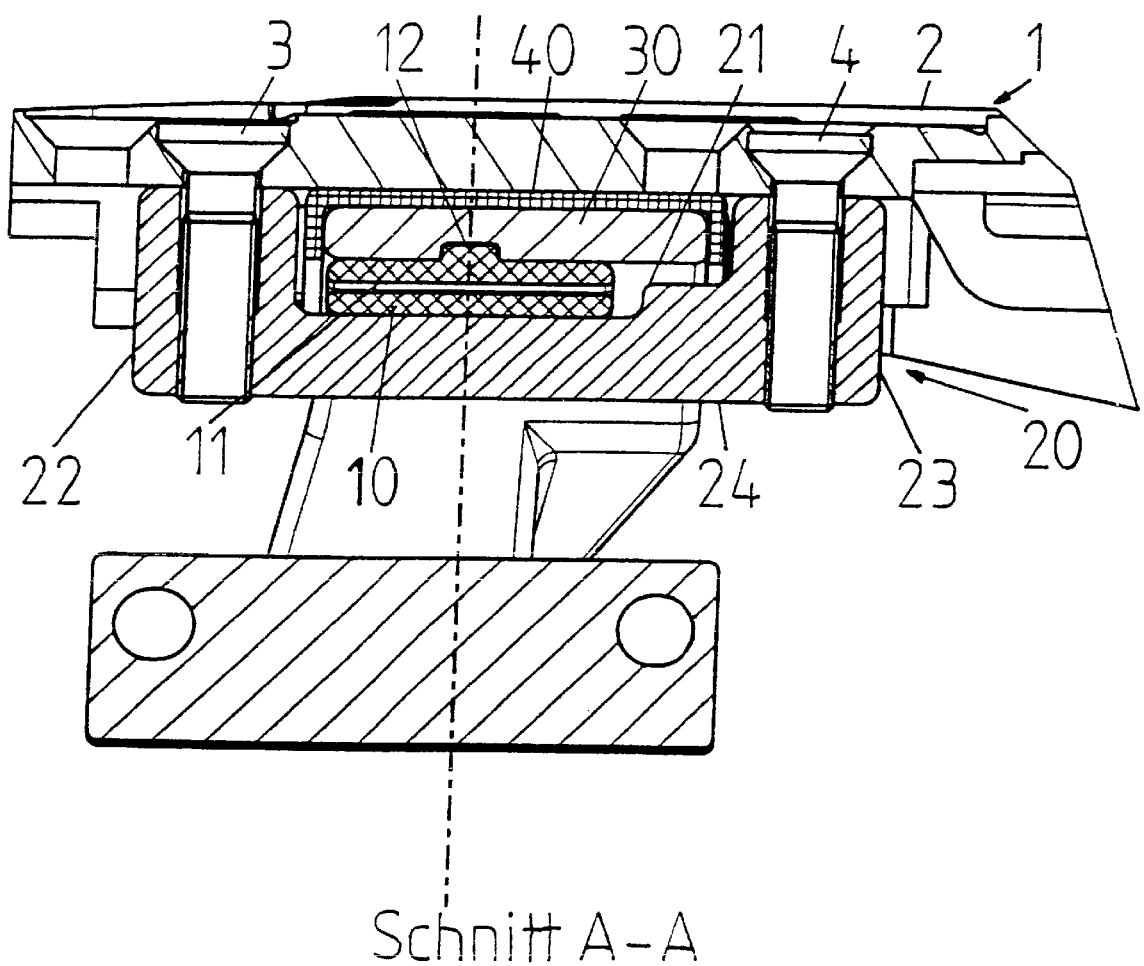
FIG. 2 is a longitudinal section along the axis A—A.
Figure 3:
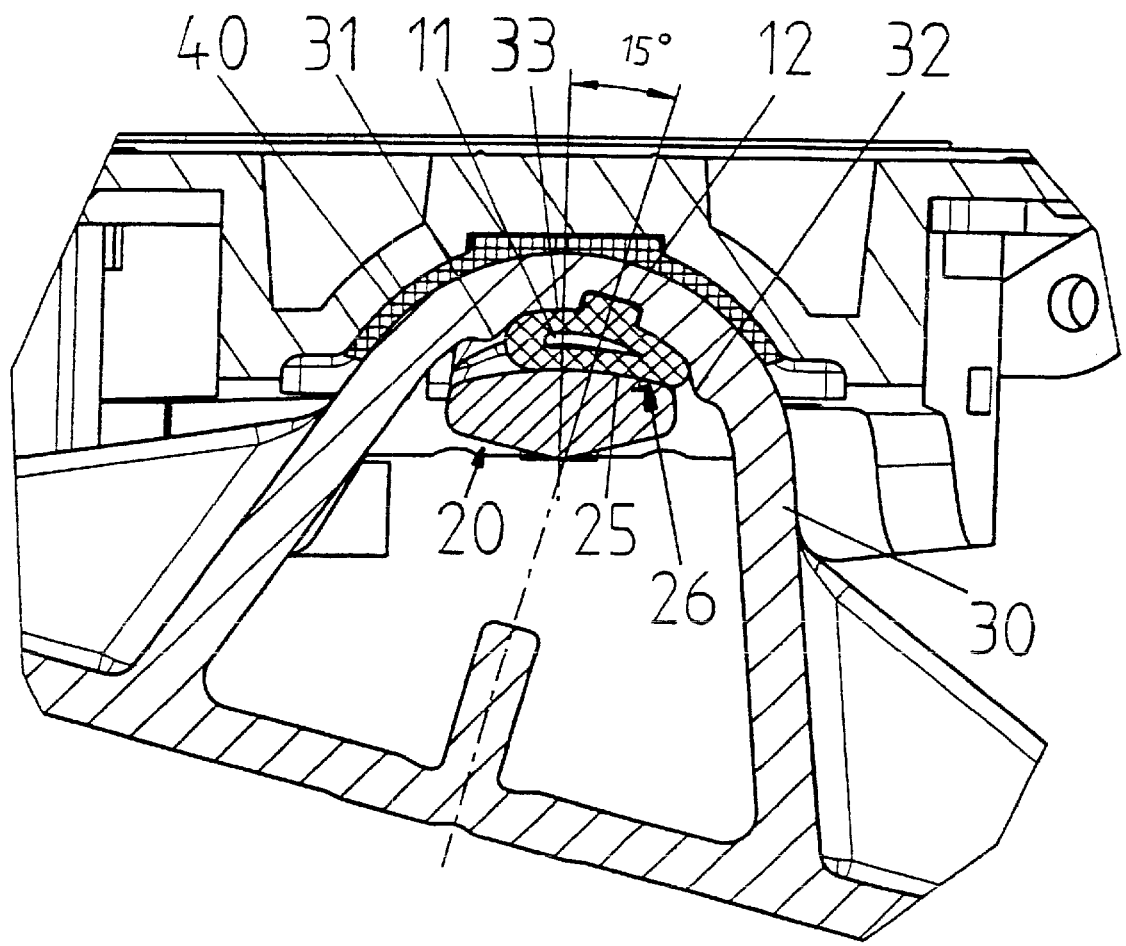
FIG. 3 is a side view per FIG. 1 with the mounting/bearing swiveled.

The fifth wheel 1 shown in FIGS. 1 through 3 is of a conventional design with respect to its actual coupling mechanisms. A bridge 20 can be connected to the underside of a coupling plate 2 by means of two bolts 3, 4.

The bearing pedestal 30 is stirrup-shaped, as can be seen in FIGS. 1 and 3. It is supported against the coupling plate 2 via a plastic bearing shell 40. The purpose of the plastic bearing shell 40 is to avoid wear on the underside of the coupling plate 2 and on the top of the stirrup-shaped bearing pedestal 30.

In FIGS. 1 and 3, the two retaining elements 31 can be seen as protruding ribs in the top region of the stirrup-shaped bearing pedestal 30. The walking element 10 is located between these two retaining elements 31, 32, the stirrup-shaped bearing pedestal 30 and the bridge 20.

As shown in FIG. 2, the bridge 20 is essentially U-shaped and comprises a horizontal connecting web 24 with arms 22, 23, one on each end, into which the bolts 3, 4 for connecting the bridge 20 to the coupling plate 2 are fitted. The connecting web 24 has a step-like projection 21 between the walking element 10 and the arm 23. This step-like projection 21 prevents damage to the walking element 10 when the fifth wheel is subjected to a tensile load, since the step-like projection 21 is braced against the inside of the stirrup-shaped bearing pedestal 30, resulting in a protected residual space remaining between the bridge 20 and the bearing pedestal 30. Under normal load, there is a clearance on all sides between the connecting web 24 of the bridge 20 and the bearing pedestal 30.

The hose and tube-shaped walking element 10 extends in the direction of the lateral axis of the vehicle and is compressed when installed. As can be seen in FIGS. 1 through 3, a cavity 11 is still present when installed. FIG. 2 also shows the nub 12, which engages in a corresponding recess in the bearing pedestal 30 to fix the walking element 10.

FIG. 3 illustrates how the walking element 10 works with the tractor offset by 15 degrees from the trailer. The cross-section of the walking element 10, which was symmetrical in the as-installed condition, has changed. The radius of curvature 26 of the bridge cross-section is greater than the radius of curvature 34 of the stirrup-shaped bearing pedestal. In the compressed region of the walking element 10, the angle between the inner surface of the bearing pedestal 30 to the right of the center axis A—A which contacts the walking element and the top surface of the connecting web 25 which contacts the walking element 10 increases as the offset between tractor and trailer increases. The retaining element 32 helps to fix the walking element 10 at maximum offset. Retaining elements 31, 32 rest against the walking element 10 only in the as-installed condition. It is clearly shown in FIG. 3 that the walking element 10 hardly moves from its installed position relative to the stirrup-shaped bearing pedestal 30, but shows significant movement relative to the bridge 20. This is made possible by the greater width of the contact surface of the connecting web 25 compared to the width of the walking element so that the walking element 10 can roll on the connecting web 24 of the bridge 20.

REFERENCE NUMBERS

1 Fifth wheel
2 Coupling plate
3 Bolts
4 Bolts
10 Walking element
11 Cavity in walking element
12 Nub
20 Bridge
21 Step-like projection
22 Arm
23 Arm
24 Connecting web
25 Contact surface of the connecting web
26 Radius of curvature of the bridge cross-section
30 Stirrup-shaped bearing pedestal
31 Retaining element
32 Retaining element
33 Inner surface of the bearing pedestal
34 Radius of curvature of the stirrup-shaped bearing pedestal
40 Plastic bearing shell

What is claimed is:

1. A mounting/bearing device for a fifth wheel comprising: a stirrup-shaped bearing pedestal and a bridge parallel to the swiveling axis of the fifth wheel, which bridge can be connected to a coupling plate of the fifth wheel, whereby a damping element is arranged between the bearing pedestal and the bridge as a walking element, wherein the walking element has at least one cavity in the as-installed condition.

2. A device as claimed in claim 1, wherein the walking element is made of rubber.

3. A device as claimed in claim 1, wherein the walking element is made of polyurethane.

4. A device as claimed in claim 1, wherein the walking element is made of spring steel.

5. A device as claimed in claim 1, wherein the walking element is tubular.

6. A device as claimed in claim 1, wherein the cavity of the walking element is so large that the inside surfaces of the walking element do not rub against one another in the as-installed condition.

7. A device as claimed in claim 1, wherein a means for the positive/form-fit fixing of the walking element is molded onto the walking element and the stirrup-shaped bearing pedestal or the bridge.

8. A device as claimed in claim 1, wherein there is at least one nub on an outer surface of the walking element, which nub engages in a recess in the stirrup-shaped bearing pedestal or the bridge.

9. A device as claimed in claim 1, wherein the walking element is fastened to the bridge or the stirrup-shaped bearing pedestal.

10. A device as claimed in claim 1, wherein the walking element is adhesively connected to the bridge or the stirrup-shaped bearing pedestal.

11. A device as claimed in claim 1, wherein in the contact area of the walking element with the bridge and the stirrup-shaped bearing pedestal, the radius of curvature of the bridge cross-section is matched to the stirrup-shaped bearing pedestal in such a way that a wedge-shaped installation space is created.

12. A device as claimed in claim 1, wherein the bridge comprises two arms and a connecting web, whereby the connecting web has a step-like projection in at least one area between the walking element and one arm.

13. A device as claimed in claim 1, wherein the stirrup-shaped bearing pedestal has at least two retaining element on its inner surface protruding toward the circumference of the walking element.

14. A device as claimed in claim 1, wherein the walking element is made of rubber, polyurethane, or spring steel.

15. A device as claimed in claim 14, wherein the walking element is tubular.

16. A device as claimed in claim 15, wherein the cavity of the walking element is so large that the inside surfaces of the walking element do not rub against one another in the as-installed condition.

17. A device as claimed in claim 16, wherein a means for the positive/form-fit fixing of the walking element is molded onto the walking element and the stirrup-shaped bearing pedestal or the bridge.

18. A device as claimed in claim 17, wherein there is at least one nub on an outer surface of the walking element, which nub engages in a recess in the stirrup-shaped bearing pedestal or the bridge.

19. A device as claimed in claim 18, wherein the walking element is fastened or adhesively connected to the bridge or the stirrup-shaped bearing pedestal.

20. A device as claimed in claim 19, wherein in the contact area of the walking element with the bridge and the stirrup-shaped bearing pedestal, the radium of curvature of the bridge cross-section is matched to the stirrup-shaped bearing pedestal in such a way that a wedge-shaped installation space is created, wherein the bridge comprises two arms and a connecting web, whereby the connecting web has a step-like projection in at least one area between the walking element and one arm, and wherein the stirrup-shaped bearing pedestal has at least two retaining elements on its inner surface protruding toward the circumference of the walking element.

* * * * *